US011244327B1

(12) United States Patent
Aberman

(10) Patent No.: US 11,244,327 B1
(45) Date of Patent: Feb. 8, 2022

(54) METHODS AND SYSTEMS FOR DETERMINING REACH INFORMATION

(71) Applicant: SINTEC MEDIA LTD., Jerusalem (IL)

(72) Inventor: Sam Aberman, London (GB)

(73) Assignee: SINTEC MEDIA LTD., Jerusalem (IL)

( * ) Notice: Subject to any disclaimer, the term of this patent is extended or adjusted under 35 U.S.C. 154(b) by 0 days.

(21) Appl. No.: 16/554,934

(22) Filed: Aug. 29, 2019

Related U.S. Application Data

(60) Provisional application No. 62/724,447, filed on Aug. 29, 2018.

(51) Int. Cl.
*G06Q 30/02* (2012.01)
*G06N 20/00* (2019.01)
*G06N 5/04* (2006.01)

(52) U.S. Cl.
CPC .......... *G06Q 30/0201* (2013.01); *G06N 5/04* (2013.01); *G06N 20/00* (2019.01); *G06Q 30/0204* (2013.01); *G06Q 30/0246* (2013.01); *G06Q 30/0254* (2013.01); *G06Q 30/0255* (2013.01); *G06Q 30/0264* (2013.01)

(58) Field of Classification Search
CPC .................................................... G06Q 30/02
See application file for complete search history.

(56) References Cited

U.S. PATENT DOCUMENTS

| 6,308,168 | B1* | 10/2001 | Dovich ................. G06F 16/283 |
| 9,723,372 | B1 | 8/2017 | McLean et al. |
| 9,785,955 | B2 | 10/2017 | Secretan et al. |
| 2001/0020236 | A1* | 9/2001 | Cannon ................... G06Q 30/02 |
| 2003/0023489 | A1* | 1/2003 | McGuire ................ G06Q 30/02 705/14.55 |
| 2006/0041480 | A1* | 2/2006 | Briggs .................... G06Q 30/02 705/14.41 |
| 2006/0168613 | A1* | 7/2006 | Wood ...................... G06Q 30/02 725/11 |
| 2008/0228543 | A1* | 9/2008 | Doe ......................... G06Q 30/02 705/14.41 |
| 2008/0250447 | A1* | 10/2008 | Rowe ...................... G06Q 30/02 725/32 |
| 2010/0235219 | A1* | 9/2010 | Merrick ................. G06Q 10/04 705/7.38 |
| 2011/0288907 | A1* | 11/2011 | Harvey ............... G06Q 10/0639 705/7.29 |
| 2012/0158485 | A1* | 6/2012 | Ogawa ................... G06Q 30/02 705/14.42 |

(Continued)

OTHER PUBLICATIONS

Cross-validation (statistics); URL: https://en.wikipedia.org/wiki/Cross-validation_(statistics) last edited on Jul. 26, 2019.

(Continued)

*Primary Examiner* — Vincent M Cao
(74) *Attorney, Agent, or Firm* — DLA Piper LLP (US)

(57) ABSTRACT

Methods and systems for determining cumulative reach information. Duplicated watching habits of viewers in a designated market can be analyzed using campaign spot plans. The campaign spot plans can be applied to single viewer data to calculate campaign spot plan Television Average Ratings Points (TARP) pattern information. The TARP pattern information can be translated into reach information. Cumulative reach information can be determined using the reach information.

22 Claims, 14 Drawing Sheets

205 — Generate Simulated Campaign Plans Against Real Veiwership data

210 — Calculate Reach

215 — Normalize Reach

220 — Calculate Frequency

(56) References Cited

U.S. PATENT DOCUMENTS

| | | | |
|---|---|---|---|
| 2013/0080264 A1* | 3/2013 | Umeda | G06Q 30/02 705/14.69 |
| 2013/0179917 A1 | 7/2013 | Gu et al. | |
| 2013/0311408 A1 | 11/2013 | Bagga et al. | |
| 2016/0037197 A1* | 2/2016 | Kitts | H04N 21/4667 725/35 |
| 2017/0142465 A1 | 5/2017 | Ray et al. | |
| 2017/0255971 A1 | 9/2017 | Box et al. | |

OTHER PUBLICATIONS

Hyperparameter (machine learning); URL: https://en.wikipedia.org/wiki/Hyperparameter_(machine_learning) last edited on Jul. 16, 2017.

Overfitting; URL: https://en.wikipedia.org/wiki/Overfitting last edited on Jul. 9, 2019.

Youngsub Han, A Study of Aspect-Based Sentiment Analysis in Social Media, May 2017, Towson University (Year: 2017).

Jesse Vig et al., Tagsplanations: Explaining Recommendations Using Tags, Feb. 2009, IUI'09 pp. 47-56 (Year: 2009).

Marton Mestyan et al., Early Prediction of Movie Box Office Success Based on Wikipedia Activity Big Data, Aug. 2013, PLOS ONE Aug. 2013 vol. 8 Issue 8 e71226 (Year: 2013).

https://en.wikipedia.org/wiki/XGBoost; dated Jun. 1, 2019, 2 pages.

https://research.fb.com/prophet-forecasting-at-scale/, dated Jun. 12, 2019, 9 pages.

https://nlp.stanford.edu/projects/glove/, dated Jun. 3, 2019, 3 pages.

File History of U.S. Appl. No. 16/714,562, filed Dec. 13, 2019 retrieved Mar. 25, 2020.

File History of U.S. Appl. No. 16/444,514, filed Jun. 18, 2019 retrieved Mar. 25, 2020.

U.S. Appl. No. 16/554,934 from Mar. 25, 2020 to Nov. 6, 2020.

U.S. Appl. No. 16/444,514 from retrieved Mar. 25, 2020 to Nov. 6, 2020.

U.S. Appl. No. 16/444,514 on Aug. 25, 2021 from May 6, 2021 to Aug. 25, 2021.

U.S. Appl. No. 16/714,562 on Aug. 25, 2021 from Apr. 14, 2021 to Aug. 25, 2021.

U.S. Appl. No. 16/444,514 on Nov. 15, 2021 from Sep. 7, 2021 to Nov. 15, 2021.

* cited by examiner

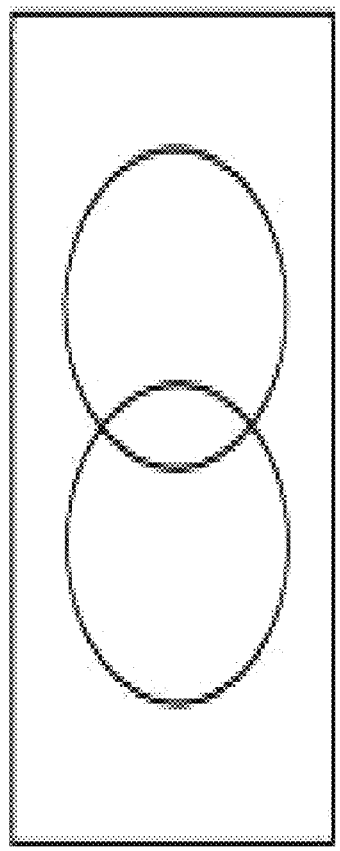
FIG.1A — medium case
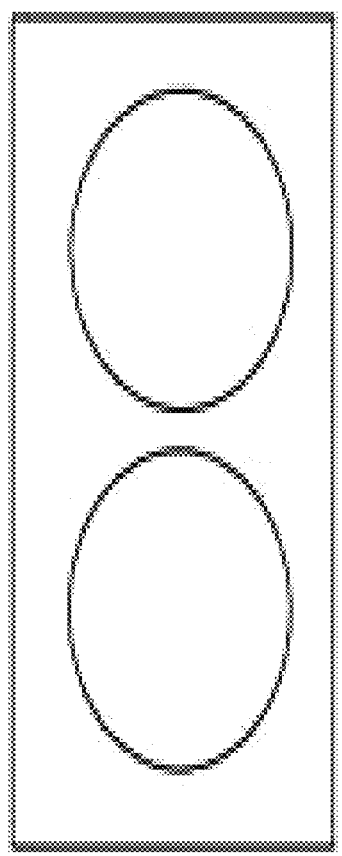
FIG.1B — maximal possible reach
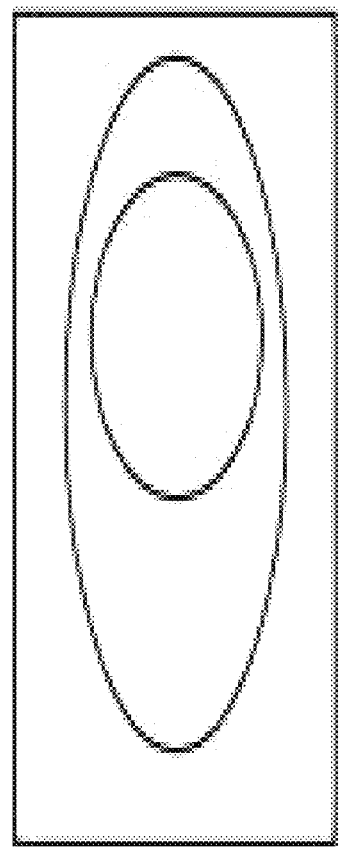
FIG.1C — minimal possible reach

OPERATIVE / DUPLICATION MATRIX

| Program | Program | Duplicated Reach |
|---|---|---|
| Program A | Program B | 20% |
| Program A | Program C | 15% |
| Program B | Program C | 30% |

| Program | Program | Duplicated Reach |
|---|---|---|
| Program A | Program B | Program C | ??? |

Duplication Matrix Problems
- No duplication data beyond 2nd level
- Variation of mathematics and capping applied by companies
- Relevancy to changing factors: Period, Schedule, Market

FIG. 6

OPERATIVE / DEEP LEARNING SOLUTION CONCEPT

- Use large volume of labelled detailed viewership data.
  - Individual member panel viewership data (multiple years)
  - STB data (1 year)
- Define NBC O&O typical Campaign attributes.
  - Sample case (10 campaigns)
- Generate huge volume of randomized campaigns in NBC O&O style.
  - Factor variation of demographics, channels and campaign durations.
- Train deep learning model to learn how data features impact cumulative reach.
- Evaluate best hyper parameters for optimized model.
- Test model produced reach against real campaigns and compare results to traditional solutions and ideally Nielsen calculated reach.

FIG. 7

OPERATIVE / LEARNING VIEWING PATTERN

| Parameter | Program | Program | Program |
|---|---|---|---|
| Content | Program A | Program B | Program C |
| Channel/Station | Station A | Station A | Station B |
| Date | Jan 10th | Jan 10th | Jan 11th |
| Day of Week | Friday | Friday | Saturday |
| Weekday/Weekend | Weekday | Weekday | Weekend |
| Start Time | 20:00 | 22:00 | 21:00 |
| Day Part | Primetime | Primetime | Primetime |
| Rating By Demo | R1 | R2 | R3 |

FIG. 8

OPERATIVE / CAMPAIGN PARAMETERS USED

- Campaign Duration
- Number of spots
- Total GRP
- Max possible reach
- Min possible reach (based on Max single GRP)
- Numbers of spots > 0 GRP
- STD GRP
- Number of days
- Distribution of spots ratings per week day
- Number of channels
- Day parts analysis (max reach, Proportion of cumulative ratings, rating distribution etc.)
- Spots and ratings distribution over channels.
- Weekdays/Weekend/Program specific time

FIG. 9

OPERATIVE / CAMPAIGN SAMPLE

| Station | Time | Days | Program Name | Length | SE 15 | SE 22 | SE 29 | OC 6 | OC 13 | OC 20 | OC 27 | NO 3 |
|---|---|---|---|---|---|---|---|---|---|---|---|---|
| WTVJ | 07:00a-09:00a | Mo-Fr | TODAY SHOW | :30 | | | | | | | | |
| WTVJ | 07:00a-09:00a | Mo-Fr | TODAY SHOW | BE :15 | | | 10 | 10 | 10 | 10 | 10 | 10 |
| WTVJ | 07:00a-09:00a | Mo-Fr | TODAY SHOW | :30 | | 5 | | | | | | |
| WTVJ | 02:00p-03:00p | Mo-Fr | MEREDITH VIEIRA | :30 | | | | | | | | |
| WTVJ | 02:00p-03:00p | Mo-Fr | MEREDITH VIEIRA | BE :15 | | | | | | | | |
| WTVJ | 03:00p-04:00p | Mo-Fr | STEVE HARVEY! | :30 | | | | | | | | |
| WTVJ | 03:00p-04:00p | Mo-Fr | STEVE HARVEY! | BE :15 | | | | | | | | |
| WTVJ | 04:00p-05:00p | Mo-Fr | ELLEN | BE :15 | | | 10 | 10 | 10 | 10 | 10 | 10 |
| WTVJ | 04:00p-05:00p | Mo-Fr | ELLEN | BE :15 | | 5 | | | | | | |
| WTVJ | 04:00p-05:00p | Mo-Fr | ELLEN | :30 | | | 10 | 10 | 10 | 10 | 10 | 10 |
| WTVJ | 07:00p-08:00p | Mo-Fr | EXTRA/ACCESS ROTATION | BE :15 | | | 10 | 10 | 10 | 10 | 10 | 10 |
| WTVJ | 07:00p-08:00p | Mo-Fr | EXTRA/ACCESS ROTATION | :30 | | 5 | | | | | | |
| WTVJ | 07:00p-08:00p | Mo-Fr | EXTRA/ACCESS ROTATION | :30 | | | | | | | | |
| WTVJ | 07:30p-08:00p | Mo-Fr | ACCESS HOLLYWOOD | :30 | | | | | | | | |
| WTVJ | 11:35p-12:35a | Mo-Fr | TONIGHT SHOW W/ JIMMY FALLON | :30 | | 3 | | | | | | 3 |
| WTVJ | 11:35p-12:35a | Mo-Fr | TONIGHT SHOW W/ JIMMY FALLON | BE :15 | | | 10 | 10 | 10 | 10 | 10 | 10 |
| WTVJ | 12:35a-01:35a | Mo-Fr | LATE NIGHT W/ SETH MEYERS | BE :15 | | | | | | | | |
| WTVJ | 12:35a-01:35a | Mo-Fr | LATE NIGHT W/ SETH MEYERS | BE :15 | | | 10 | 10 | 10 | 10 | 10 | 10 |
| WTVJ | 01:35a-02:05a | Mo-Fr | CARSON DALY | :30 | | | | | | | | |
| WTVJ | 01:35a-02:05a | Mo-Fr | CARSON DALY | BE | | | | | | | | |
| WTVJ | 08:00p-10:00p | Mon | THE VOICE PREMIERE 9/22 | :30 | | 1 | 1 | | | | | 2 |
| WTVJ | 10:00p-11:00p | Mon | THE BLACKLIST PREMIERE 9/22 | :30 | | 1 | 1 | | | | | 2 |
| WTVJ | 10:00p-11:00p | Tue | CHICAGO FIRE PREMIERE 9/23 | :30 | | | | | | | | |
| WTVJ | 10:00p-11:00p | Thu | PARENTHOOD FNL SEASON 9/25 | :30 | | 1 | 1 | | | | | 2 |
| WTVJ | 11:30p-01:00a | Sat | SATURDAY NIGHT LIVE | :30 | | 3 | 3 | | | | | 6 |
| WTVJ | 11:30p-01:00a | Sat | SATURDAY NIGHT LIVE | BE :15 | | | | 4 | 4 | 4 | 4 | 12 |
| WTVJ | 08:15p-11:30p | Sun | NFL SUNDAY NIGHT FOOTBALL | :30 | | 1 | | | | | | 1 |
| MIAMI | | | | | | | | | | | | 303 |

FIG. 10

OPERATIVE / DEEP LEARNING MODEL

- AWS
- 256Gb RAM
- 32 Cores
- Parallel Computing
- Deep Learning Model
- Tested Configuration: Best of ≈ 300 hyper parameters combinations (Grid search with cross validation)
- Training time: ≈ 1 Week

| OPERATIVE / FEATURE IMPORTANCE | |
|---|---|
| Feature | Importance |
| Spot (Frequency) | 122,411 |
| Minimal possible Reach | 97,107 |
| Maximal possible reach | 79,341 |
| TARP (Mean) | 72,607 |
| Day Number | 71,525 |
| Midweek Identifier | 67,570 |
| Number of zero rating spots | 58,210 |
| TARP (Standard Div) | 55,764 |
| TARP (Tuesday Value) | 53,851 |
| Weekend Identifier | 52,387 |
| TARP (Saturday Value) | 51,900 |

METHODS AND SYSTEMS FOR DETERMINING REACH INFORMATION

CROSS-REFERENCE TO RELATED APPLICATIONS

This application claims the benefit of U.S. Provisional Application No. 62/724,447, filed Aug. 29, 2018. This application is incorporated by reference in its entirety.

BRIEF DESCRIPTION OF THE DRAWINGS

FIGS. 1A-1C illustrate example reach calculations that can be used in embodiments of the invention.

FIG. 3 illustrates a simulated campaign plan construct sample that can be used in embodiments of the invention.

FIG. 5 illustrates a chart showing example data that can be used in embodiments of the invention.

FIG. 6 illustrates an example Reach and Frequency process that can be used in embodiments of the invention.

FIG. 7-8 illustrate example parameters that can be used in embodiments of the invention.

FIG. 9 illustrates example data that can be used in embodiments of the invention to generate campaign statistics that can be used to train a Reach and Frequency model.

FIG. 10 illustrates example features of a system that can be used to generate the reach and frequency calculations in some embodiments of the invention.

DETAILED DESCRIPTION OF EMBODIMENTS

Systems and methods are disclosed herein for performing advertising Reach and Frequency calculations to determine how many people were uniquely exposed to a broadcaster message (e.g., an advertising campaign).

Mathematical models based on duplication matrices (e.g., how many people watch a cross of two or more programs) can be used. Machine learning can be utilized along with panel data. Panel data can be data learned from an individual level analysis of viewing patterns (e.g., Nielsen Panels). A group of people who are monitored individually can be selected and weighed to be used in panel data. In some embodiments, the full panel data is utilized with the machine learning. In other embodiments, only a subset of the full panel data is utilized with the machine learning.

For example, summary reporting of people who watched the different programs where a broadcaster message was shown can be used. The Reach and Frequency calculations can be based on complex training on mass data volume, utilizing machine learning algorithms, and costume feature creation. In some embodiments, numerous (e.g., more than 300,000) advertising campaigns can be processed and analyzed using advanced machine-learning and deep-learning tools in order to predict the Reach and Frequency for a given advertising campaign.

In some embodiments, the given advertising campaign can be one structured using typical panel data information provided in a particular local market. In some embodiments, the Reach can be for a specific target demographic, using, for example, age & gender constructs. (Note that any type of demographic may be used.)

In some embodiments, the data that is available to help determine the prediction can be a detailed campaign spot proposal plan, which can contain the following attributes:

Market
Station
Daypart
Time
Day, or range of days (Typically Weekdays or Weekend)
Program Name
Length (Spot Duration)
Rate
Ratings The Reach that can be determined can comprise the distinct number of viewers for the campaign (e.g., how many different people saw the campaign at least once). In some situations, mathematical models based on duplication matrix (e.g., how many different people watch a cross of two programs) can be used. However, it becomes complex to use these models when additional programs are added (e.g., how many different people watch programs A+B+C etc.)

FIGS. 1A-1C illustrate a very simple example. If the campaign contains only two spots, the Reach can vary between the sum of the two ratings (e.g., the maximum possible Reach (e.g., FIG. 1B) of rating A and rating B, where there is no intersection between the viewers of spot A and the viewers of spot B, and the minimal possible Reach (e.g., FIG. 1C), where all the viewers of one spot are contained within the viewers of the other spot). FIG. 1A illustrates a medium case.

Figure 4:
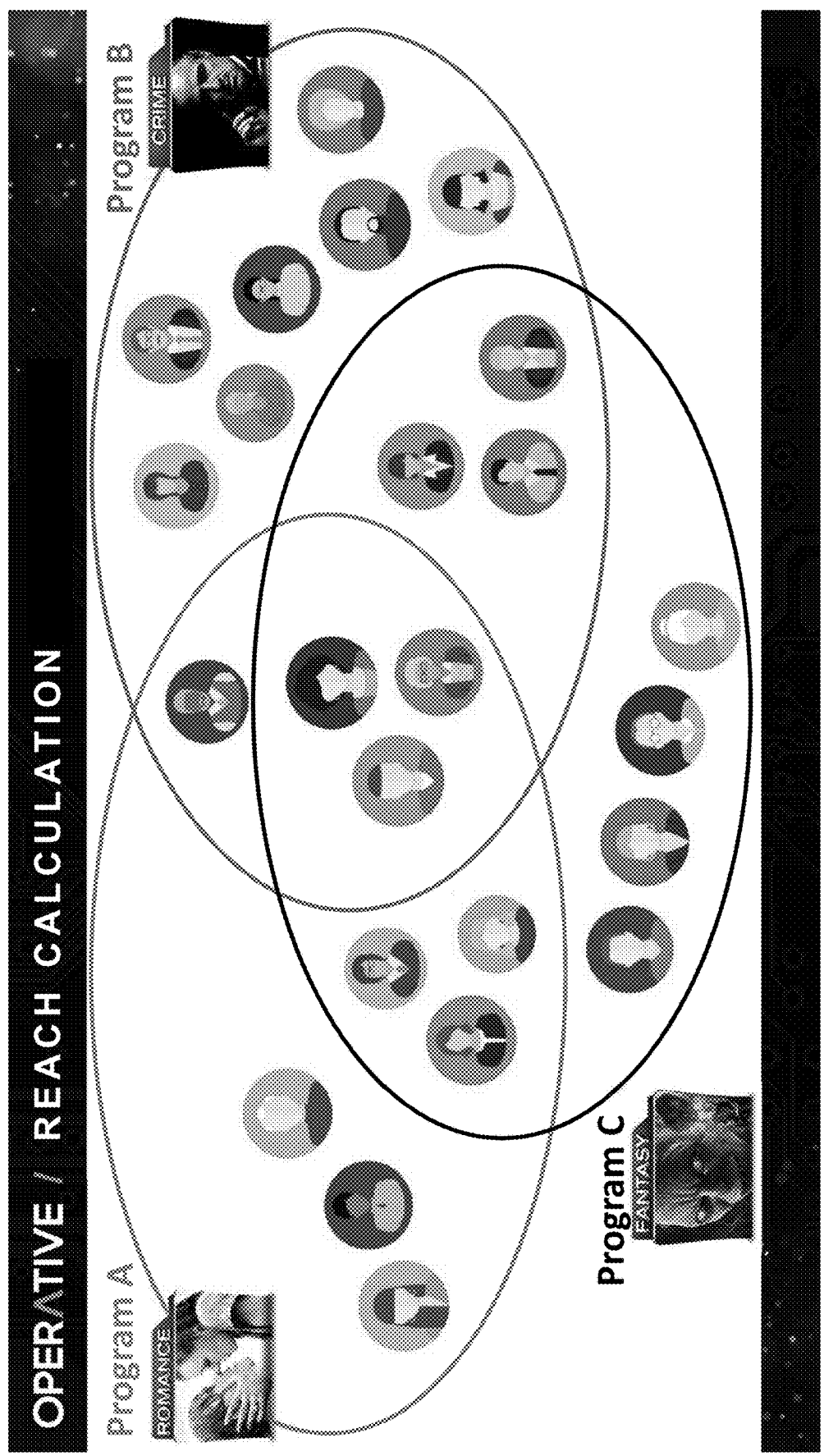
FIG. 4 illustrates a chart where an intersection of people can be seen that can be used in embodiments of the invention.

In FIGS. 1A-1C, the Reach is illustrated as the total area of the circles, which can have an inverse correlation to the size of the intersection. (FIG. 4 illustrates a similar chart where the intersection of the people can be seen. FIG. 5 illustrates a chart showing example data.) For example, a small intersection could indicate a large Reach, and a large intersection could indicate a small Reach. The Reach can be calculated using an inclusion-exclusion principle. Thus, for the example above, using the inclusion-exclusion principle, the Reach can be:

$$\text{Reach} = |A| + |B| - |A \cap B|$$

As another example, for a campaign with three spots, the Reach can be:

$$\text{Reach} = |A| + |B| + |C| - |A \cap B| - |A \cap C| - |B \cap C| + |A \cap B \cap C|$$

Similarly, the formula can become exponentially larger with each spot that is added. For a very large campaign, computing the Reach based on this formula is difficult for at least some of the following reasons:

As campaign spots are added, the amount of intersections that need to be calculated can grow exponentially—e.g. for a campaign with 100 spots, the amount of terms that needed to be computed is $2^{100}-1$. (Note that for an average campaign, the number of spots based on a sample set is approximately 250.)

It can be difficult to estimate the intersection between n-spots where n is large enough because each such calculation can add noise to the final result. This noise can add up to a significant error on the final Reach calculation.

We resolved this problem by letting machine learning analyse duplicated watching habits (watching the same time of day, watching the same type of content, watching the same channels etc. etc.)

In some embodiments, in order to overcome the above issues as well as other issues, methods and systems can be improved by utilizing a machine learning to analyze duplicated watching habits (e.g., watching the same time of day, watching the same type of content, watching the same channels, etc.) to determine Reach patterns.

FIG. 6 illustrates an example of a process that can be used. As set forth in FIG. 6, a large volume of labelled detailed viewership data can be utilized (e.g., individual member panel viewership data over years, one year STB data). Campaign attributes (e.g., such as those used by NBC O&O) can be defined for a sample case (e.g., 10 campaigns A large volume of randomized campaigns can be generated in the NBC O&O style. A variation of demographics, channels and campaign durations can be factored in. The deep learning model can be trained to learn how data features impact cumulative reach. The best hyper-parameters can be evaluated for an optimized model. The test model produced reach can then be compared against real campaigns and the results can be compared to traditional solutions.

FIG. 7 and FIG. 8 illustrate example parameters that can be used.

Figure 2:
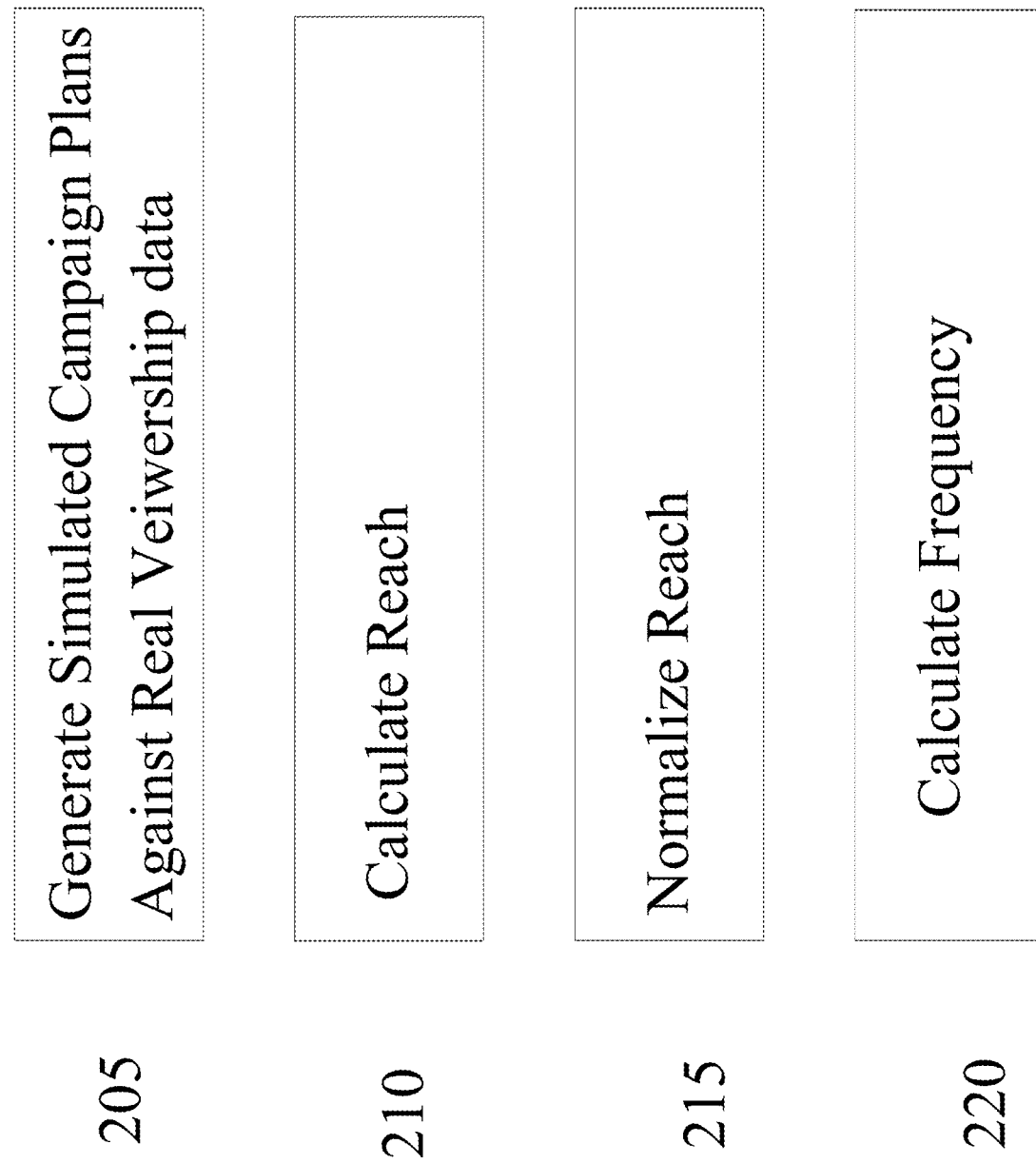
FIG. 2 illustrates example panel data that can be used against simulated campaign plans in embodiments of the invention.

For example, as shown in FIG. 2, in 205, panel data can be used against simulated campaign plans. The simulated campaign plans should be based on a typical customer campaign structure (e.g., such as one expected to be used by NBC O&O in a particular market).

Using campaign structure attributes, similar to provided samples, hundreds of thousands of synthetic campaigns (e.g., >300,000 campaigns) can be auto-generated. Variations of number of networks, demographics, campaign durations, spot number in day parts, etc. can be mixed in order to maximize the variety of samples to be used for training.

Training a deep learning model can involve fine-tuning of hyper parameters in order to optimize the performance of the model (e.g., learning rate, number of iterations, etc.).

Grid Search can be done with cross validation: For each combination of hyper parameters, the data can be split into train and validation sets. The model can be trained against the train data set and evaluated against the validation data set. After testing each combination, the hyper-parameters combination with the best score on the validation set can be selected as the final model.

Example pseudocode is below: Previous_score=−inf
For p1 in [param_11, param_12, . . . , param_1A]
  For p2 in [param_21, param_22, . . . , param_2B]
    For pM in [param_m1, param_M2, param_MC]
      Current_Model=train(campaigns_train_Set)
      Predictions=current_model.predict(campaigns_validation_set)
      Current_Score=compare(predictions, validation_set_values)
      If current_score>previous_score
        Chosen_model=current_model The construct of each campaign plan can be defined according to expected customer campaign variation needs. For example, a specific day can be used for 40% of the campaign spots, and a range of days (for example Monday-Friday) can be used for the remaining 60% of the spots. (This can be similar to the sample set provided by NBC O&O and sold by them in the local US market.)

Sample US markets can include some or all of the following in some embodiments:
LOS ANGELES
CHICAGO
DALLAS-FT. WORTH
HARTFORD & NEW HAVEN
MIAMI-FT. LAUDERDALE
NEW YORK
SAN DIEGO
SAN FRANCISCO-OAK-SA
WASHINGTON, DC
PHILADELPHIA In some embodiments, the simulated campaign plans can be preprocessed and additional features can be created for each campaign that helps the algorithm obtain a better prediction. Examples of features that can be added in some embodiments comprise any combination of the following:
Maximum possible Reach,
Minimum possible Reach,
Total Television Average Ratings Points (TARP) for each day,
Total TARP for each daypart In 210, the final model of the simulated campaign plans data (e.g., the campaign spot plans) can be applied to the known single viewer panel data in order to calculate each spot's TARP patterns, and to "translate" those TARP patterns into a cumulative Reach number for every step of the campaign (e.g., we analyze the campaign after 1 spot, 2 spots, etc.).

Example pseudocode is below:
Campaigns_feature_vectors=[ ]
Labels=[ ]
For c in all_campaigns:
  Current_feature_vector=create_feature_vector(c)
  Campaigns_feature_vectors.append(current_feature_vector)
  Labels.append(reach_of_c)
TRAIN(campaigns_feature_vector=>labels)

In some embodiments, grid-searches can be used in order to find the best hyper-parameters for the model, using cross-validation in order to achieve optimized results (and for example to avoid problems such as overfitting).

A hyperparameter can be a parameter whose value is set before the learning process begins. By contrast, the values of other parameters can be derived via training. More information on hyper-parameters can be found at Wikipedia (e.g., at the following site, which information is herein incorporated by reference):
  https://en.wikipedia.org/wiki/Hyperparameter_(machine-_learning)

Cross validation (e.g., such as k-fold) can be a model validation techniques for assessing how the results of a statistical analysis will generalize to an independent data set. More information on cross validation can be found at Wikipedia (e.g., at the following site, which information is herein incorporated by reference):
  https://en.wikipedia.org/wiki/Cross-validation_(statistics)

Overfitting can be the production of an analysis that corresponds too closely or exactly to a particular set of data, and may therefore fail to fit additional data or predict future observations reliably. More information on overfitting can be found at Wikipedia (e.g., at the following site, which information is herein incorporated by reference):

https://en.wikipedia.org/wiki/Overfitting

In 215, each Reach number can be normalized and converted to a number between 0 and 1, where 0 is the minimum possible Reach and 1 is the maximum possible Reach, according to the following formula:

$$\text{Reach\_normalized} = \frac{\text{Reach\_actual} - \text{Reach\_min}}{\text{Reach\_max} - \text{Reach\_min}}$$

So, for example, if in a given campaign the maximal possible Reach is 7%, the minimal possible Reach is 3% and the actual Reach is 6%, the normalized Reach would be:

$$\frac{6-3}{7-3} = \frac{3}{4} = 0.75$$

The normalization Reach can be used so that the algorithm can train on more similar campaigns and improve the learning of the campaign patterns.

After we get the normalized reach, we can restore the actual reach using the following formula:

REACH_ACTUAL=NORMALIZED_REACH*(REACH_MAX−REACH_MIN)+REACH_MIN

In 220, the Frequency can be calculated by the formula:

$$\text{Frequency} = \frac{\text{TOTAL\_TARP}}{\text{REACH\_ACTUAL}}$$

Figure 3:
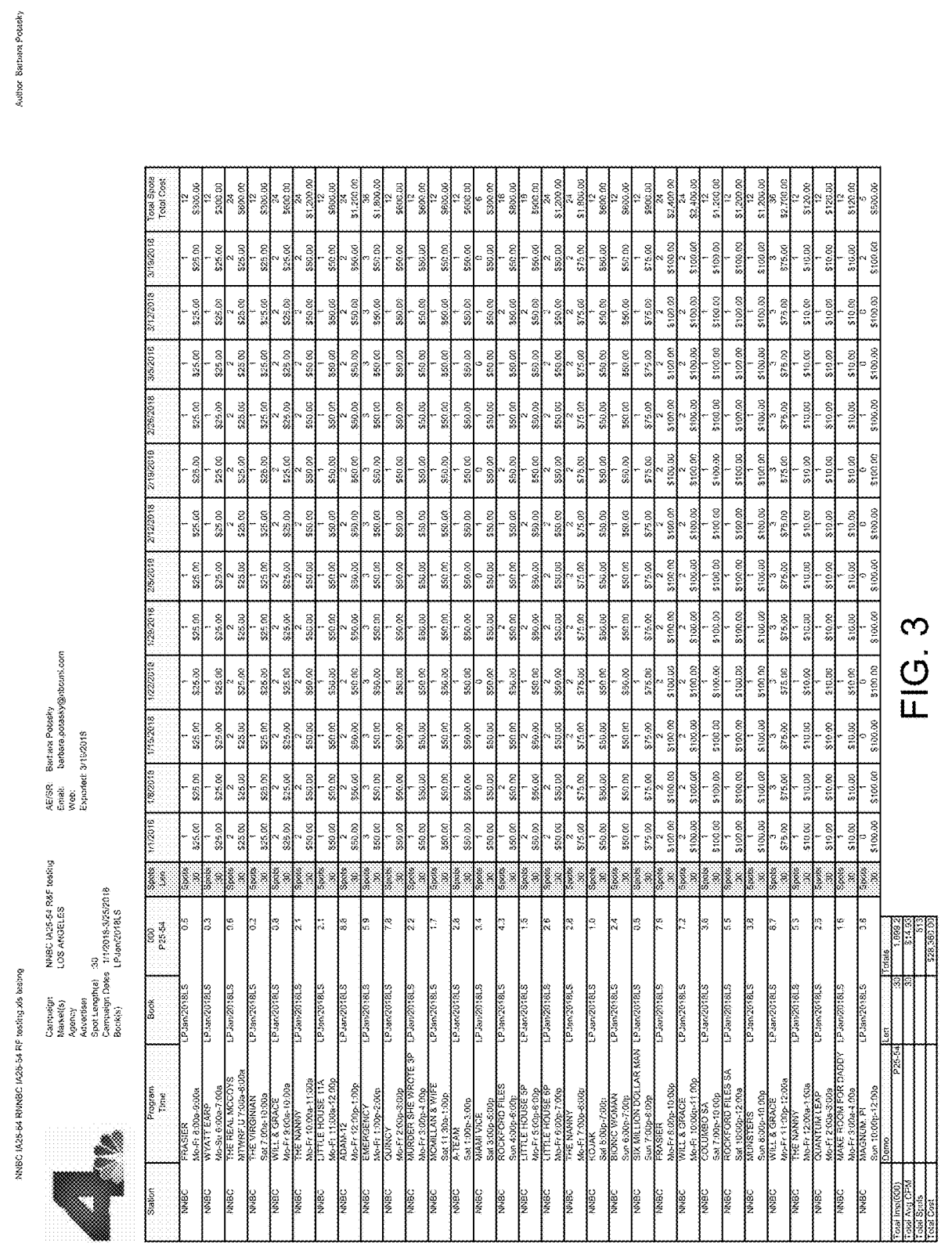

FIG. 3 illustrates a simulated campaign plan construct sample, according to an embodiment. In this example, the campaign is NNBC IA 25-54 R&F testing. The market is Los Angeles. The station column lists the stations. The program and time slot column lists the program names and the time slots involved. The spot length is 30 seconds. The campaign dates are Jan. 1, 2018-Mar. 25, 2018. The book column indicates the book information. The AE/SR (e.g., Barbara Potasky) and her contact information are listed. The date the information was exported is Mar. 19, 2018. The 000 P25-54 column lists the rating per spot for people aged 25-54. The spots length column lists how long the spots are. The columns with dates on them list the prices for various dates. The total spots total cost column lists the total amount of all the spots for a particular row.

FIG. 9 illustrates other example data that can be used to generate, for example, campaign statistics that can be used to train the Reach and Frequency model:

Number of Campaigns:
380,506
Campaign spots number:
Max number of spots in campaign: 4,588
Min number of spots in campaign: 1
Average number of spots in campaign: 63.49
Median number of spots in campaign: 20.0
Std Div of number of spots in campaign: 145.37
Demographic:
Number of demographics: 63
Max number of campaigns in one campaign demographic: 6,099
Min number of campaigns in one campaign demographic: 5,994
Average of campaigns per demographic: 6039.77
Median of campaigns per demographic: 6041.0
Std Div of campaigns per demographic: 20.67
Stations:
Number of stations: 20
Max of campaigns in one campaign station: 20163
Min of campaigns in one campaign station: 19620
Average of campaigns per station: 19897.4
Median of campaigns per station: 19900.5
Std Div of campaigns per demographic: 138.631
Campaign duration (in days):
Max days of campaigns duration: 365
Min days of campaigns duration: 1
Average of campaigns duration: 35.26
Median of campaigns duration: 21.0
Std Div of campaigns duration: 43.27

Figure 11:
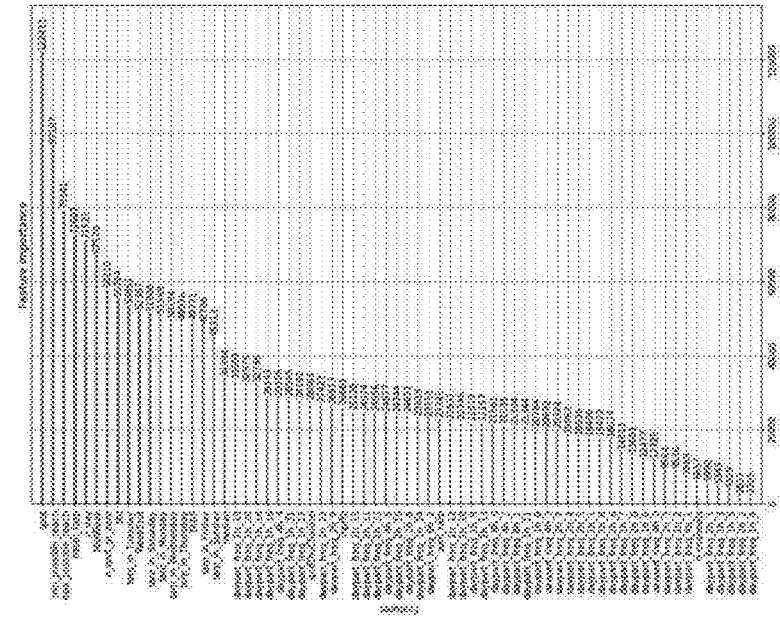
FIG. 11 illustrates example features that can be used in some embodiments of the invention.
Figure 12:
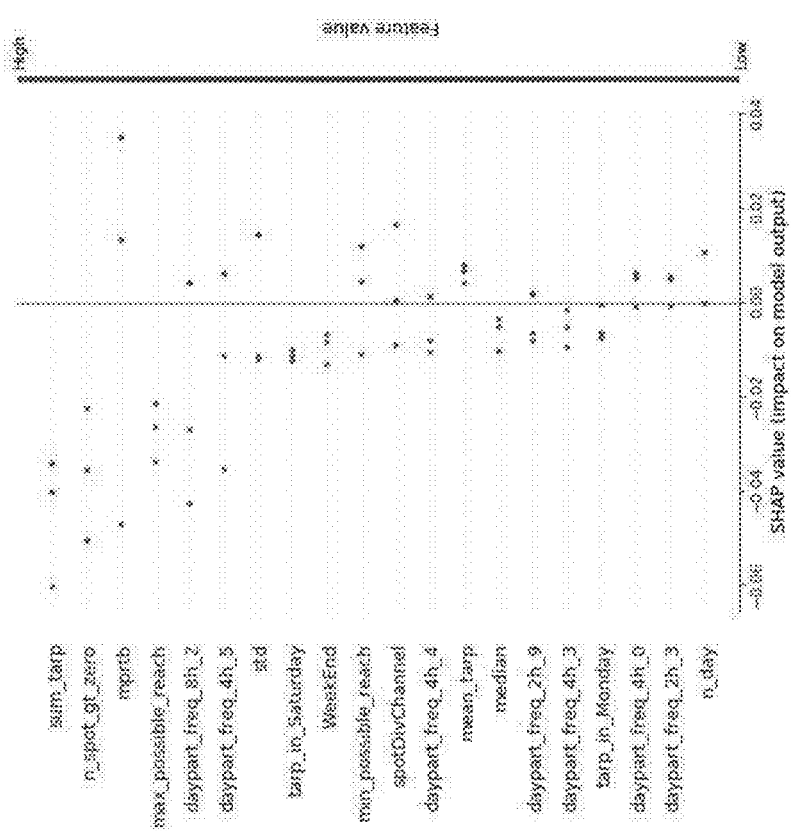
FIG. 12 illustrates an example model feature value impact, according to embodiments of the invention.
Figure 13:
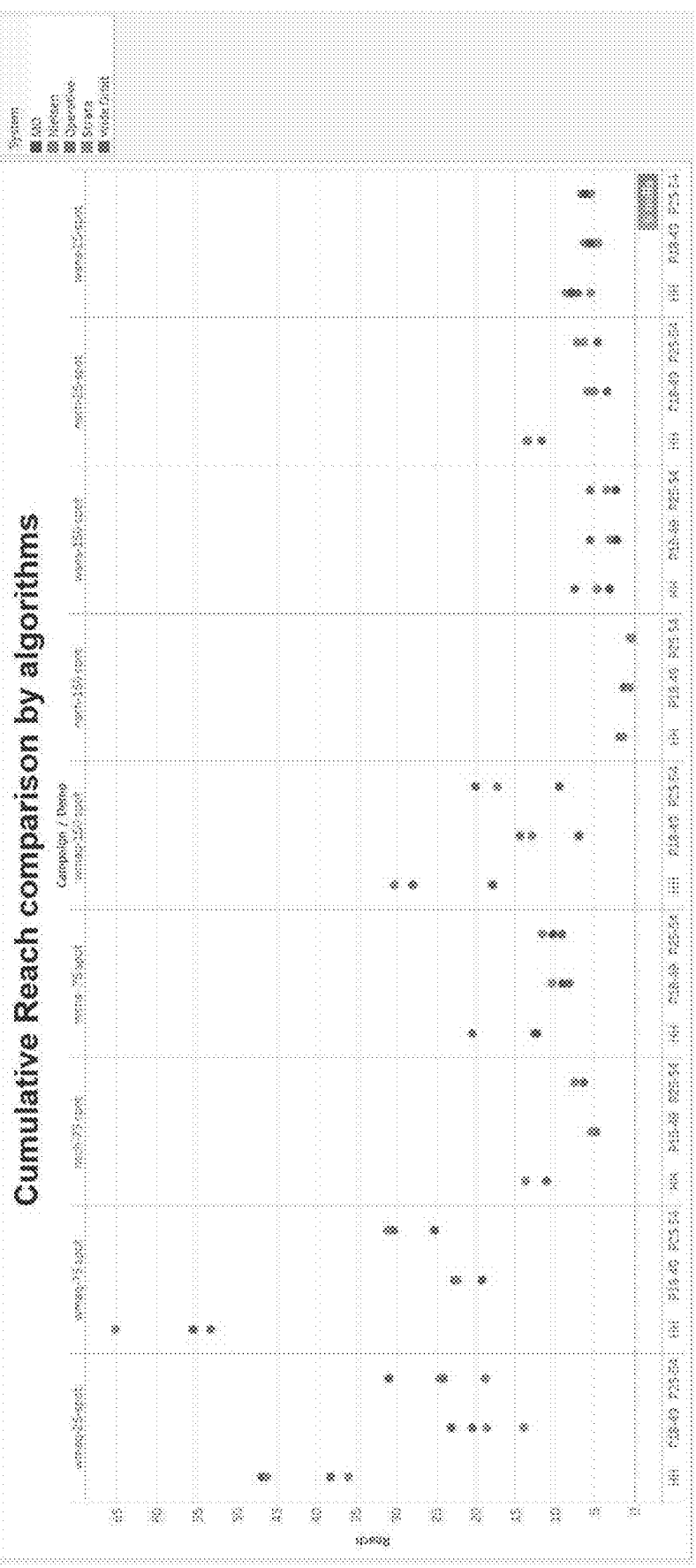
FIG. 13 illustrates example comparative results, according to embodiments of the invention.

FIG. 11 illustrates an example of the importance of various features that can be used. FIG. 12 illustrates an example model feature value impact. FIG. 13 illustrates example comparative results.

FIG. 10 illustrates example features of a system that can be used to generate the reach and frequency calculations. Any or all of the following may be included in such a system: An AWS, a 256 Gb Random Access Memory (RAM), 32 cores, and parallel computer.

Methods described herein may represent processing that occurs within a system. The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors (e.g., processor 1410 in FIG. 14) executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Figure 14:
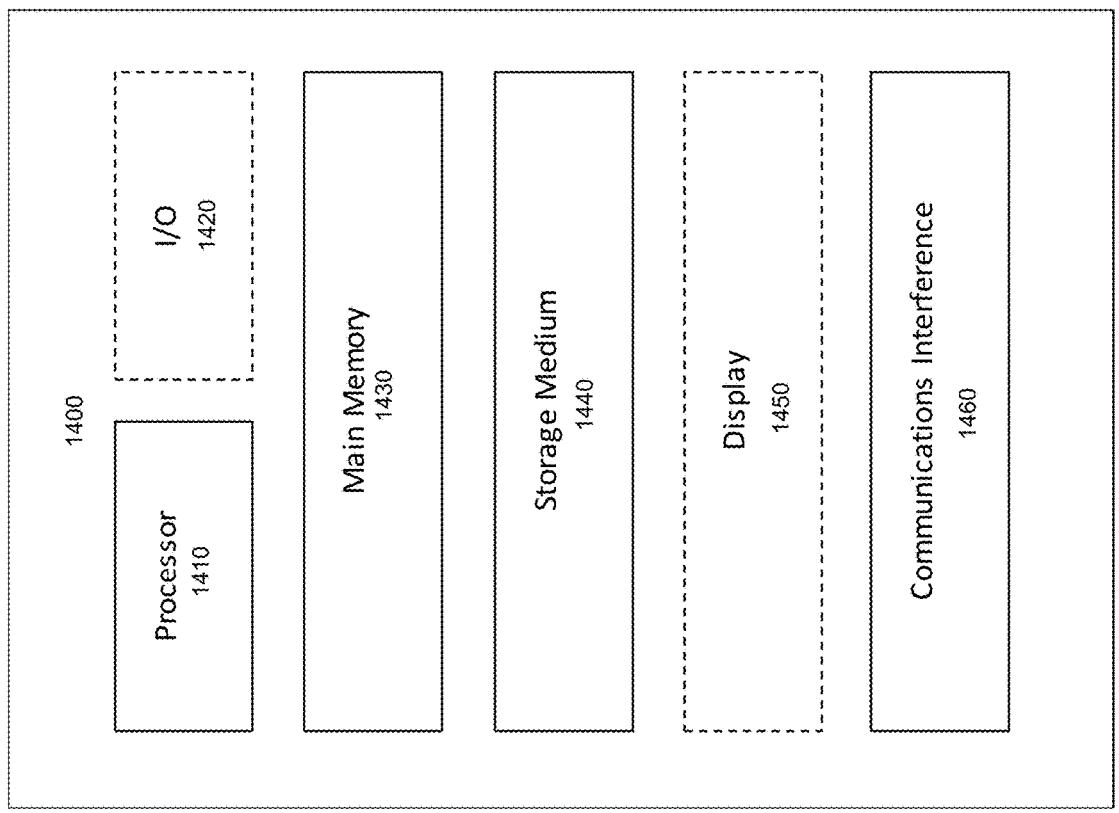
FIG. 14 illustrates an example computer that can be used in embodiments of the invention.

FIG. 14 illustrates an example computer 1405, according to some embodiments of the present disclosure. Computer 1405 can include a processor 1410 suitable for the execution of a computer program, and can include, by way of example, both general and special purpose microprocessors, and any one or more processor of any kind of digital computer. A processor can receive instructions and data from a memory 1430 (e.g., a read only memory or a random access memory or both). Processor 1410 can execute instructions and the memory 1430 can store instructions and data. A computer can include, or be operatively coupled to receive data from or transfer data to, or both, a storage medium 1440 for storing data (e.g., magnetic, magneto optical disks, or optical disks). Information carriers suitable for embodying computer program instructions and data can include all forms of nonvolatile memory, including by way of example semiconductor memory devices, such as EPROM, EEPROM, flash memory device, or magnetic disks. The processor 1410 and the memory 1430 can be supplemented by, or incorporated in, special purpose logic circuitry.

The computer 1405 can also include an input/output 1420, a display 1450, and a communications interface 1460.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any FIGS. which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method, comprising:
using a processor to obtain campaign spot plans, each campaign spot plan comprising multiple campaign spots;
using the processor to generate simulated campaign spot plans utilizing campaign structure attributes of the campaign spot plans;
analyzing, using machine learning with the processor, duplicated watching habits of viewers viewing patterns for a combination of three or more campaign spots in a designated market using the campaign spot plans, the simulated campaign spot plans, and panel data comprising observations derived over time for the viewers;
applying, using the machine learning with the processor, the campaign spot plans to single viewer data to calculate campaign spot plan Television Average Ratings Points (TARP) viewership pattern information, the TARP viewership pattern information calculated using feature vectors and control parameters to determine a reach increase after a new campaign spot is added to a campaign, the feature vectors comprising: market information, station information, daypart information, time information, day information, program information, length information, rate information, or ratings information, or any combination thereof;
translating, using the machine learning with the processor, the TARP viewership pattern information into reach information, the reach information comprising a number of viewers uniquely exposed to each campaign spot;
determining, using the processor, cumulative reach information comprising the reach information for all campaign spots in the campaign spot plan, wherein the cumulative reach information predicts a number of viewers uniquely exposed to all campaign spots in the campaign spot plan;
iteratively updating and optimizing the machine learning used with the processor; and
displaying, using the processor, the cumulative reach information.

2. The method of claim 1, wherein the reach information is determined using an inclusion-exclusion principal comprising intersection information between campaign spots.

3. The method of claim 1, wherein the reach information comprises a cumulative reach calculation for every step of the campaign spot plan.

4. The method of claim 1, wherein a normalization reach is used so that the machine learning can train using similar campaigns to improve learning the TARP viewership pattern information.

5. The method of claim 1, further comprising: determining frequency information using the TARP viewership pattern information and the reach information.

6. The method of claim 1, wherein grid-searches are used to find hyper-parameters for the model.

7. The method of claim 1, wherein the simulated campaigns have machine-learned campaign patterns learned from real life campaign patterns.

8. The method of claim 1, wherein a campaign spot comprises a program and/or a promotion.

9. The method of claim 1, wherein the cumulative reach information predicts the number of new and repeating viewers exposed to all campaign spots in the campaign spot plan.

10. The method of claim 1, wherein the TARP pattern information comprises duplicated watching habit information.

11. The method of claim 10, wherein the duplicated watching habit information comprises: watching the same time of day; watching the same type of content; or watching the same channels; or any combination thereof.

12. A system, comprising:
a processor configured for:
obtaining campaign spot plans, each campaign spot plan comprising multiple campaign spots;
generating simulated campaign spot plans utilizing campaign structure attributes of the campaign spot plans;
analyzing, using machine learning, duplicated watching habits of viewers viewing patterns for a combination of three or more campaign spots in a designated market using the campaign spot plans, the simulated campaign spot plans, and panel data comprising observations derived over time for the viewers;
applying, using the machine learning, the campaign spot plans to single viewer data to calculate campaign spot plan Television Average Ratings Points (TARP) viewership pattern information, the TARP viewership pattern information calculated using feature vectors and control parameters to determine a reach increase after a new campaign spot is added to a campaign, the feature vectors comprising: market information, station information, daypart information, time information, day information, program information, length information, rate information, or ratings information, or any combination thereof;

translating using the machine learning, the TARP viewership pattern information into reach information, the reach information comprising a number of viewers uniquely exposed to each campaign spot;

determining, using the processor, cumulative reach information comprising the reach information for all campaign spots in the campaign spot plan, wherein the cumulative reach information predicts a number of viewers uniquely exposed to all campaign spots in the campaign spot plan;

iteratively updating and optimizing the machine learning used with the processor; and displaying the cumulative reach information.

13. The system of claim 12, wherein the reach information is determined using an inclusion-exclusion principal comprising intersection information between campaign spots.

14. The system of claim 12, wherein the reach information comprises a cumulative reach calculation for every step of the campaign spot plan.

15. The system of claim 12, wherein a normalization reach is used so that the machine learning can train using similar campaigns to improve learning the TARP viewership pattern information.

16. The system of claim 12, wherein the processor is configured for: determining frequency information using the TARP viewership pattern information and the reach information.

17. The system of claim 12, wherein grid-searches are used to find hyper-parameters for the model.

18. The system of claim 12, wherein the simulated campaigns have machine-learned campaign patterns learned from real life campaign patterns.

19. The system of claim 12, wherein a campaign spot comprises a program and/or a promotion.

20. The system of claim 12, wherein the cumulative reach information predicts the number of new and repeating viewers exposed to all campaign spots in the campaign.

21. The system of claim 12, wherein the TARP pattern information comprises duplicated watching habit information.

22. The system of claim 21, wherein the duplicated watching habit information comprises: watching the same time of day; watching the same type of content; or watching the same channels; or any combination thereof.

* * * * *